United States Patent
Griffin, Jr. et al.

(10) Patent No.: US 8,583,177 B2
(45) Date of Patent: Nov. 12, 2013

(54) RECEIVER FOR AUDIO PLAYER

(75) Inventors: Paul P. Griffin, Jr., Nashville, TN (US); Benjamin T. Guy, Nashville, TN (US); David M. Reynolds, Mt. Juliet, TN (US); David A. Gilbert, Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 255 days.

(21) Appl. No.: 12/428,391

(22) Filed: Apr. 22, 2009

(65) Prior Publication Data

US 2009/0290519 A1    Nov. 26, 2009

Related U.S. Application Data

(60) Provisional application No. 61/047,043, filed on Apr. 22, 2008.

(51) Int. Cl.
- *H04B 1/38* (2006.01)
- *H04H 40/00* (2008.01)
- *H04M 3/00* (2006.01)
- *H04M 1/00* (2006.01)
- *H04W 24/00* (2009.01)

(52) U.S. Cl.
USPC ....... 455/557; 455/556.1; 455/3.06; 455/418; 455/420; 379/428.04; 379/441; 379/447

(58) Field of Classification Search
USPC .............. 455/557, 426.1, 556.1–556, 414.1, 455/456.1, 3.06, 418, 420; 379/428.04, 379/441, 447

See application file for complete search history.

(56) References Cited

U.S. PATENT DOCUMENTS

| | | | |
|---|---|---|---|
| 7,010,263 B1 * | 3/2006 | Patsiokas | 455/3.02 |
| 7,441,058 B1 * | 10/2008 | Bolton et al. | 710/105 |
| 2005/0176366 A1 * | 8/2005 | Levy | 455/3.06 |
| 2006/0141962 A1 * | 6/2006 | Forbes et al. | 455/186.1 |
| 2007/0085739 A1 * | 4/2007 | Udall | 342/357.17 |
| 2008/0134276 A1 * | 6/2008 | Orrell et al. | 725/132 |
| 2008/0165906 A1 * | 7/2008 | Ho et al. | 375/354 |
| 2008/0273477 A1 * | 11/2008 | Cotignola et al. | 370/271 |
| 2009/0275306 A1 * | 11/2009 | Kraft et al. | 455/344 |

* cited by examiner

*Primary Examiner* — Anthony Addy
*Assistant Examiner* — Michael Mapa
(74) *Attorney, Agent, or Firm* — Hornkohl Intellectual Property Law, PLLC; Jason C. Hornkohl (57) ABSTRACT

An accessory for use with an existing portable electronic device has a housing that removably couples to a housing of the existing portable electronic device such that the accessory and portable electronic device function and can be portably carried as a single unit. A tunable FM radio receiver in the housing receives an FM broadcast signal and produces a broadcast audio output. A connector on the housing electrically connects the broadcast audio output to a corresponding connector on the device. Application software residing on the device utilizes an internet connection of the device to download digital content related to the broadcast audio output and display the digital content on a display of the device.

8 Claims, 7 Drawing Sheets

RECEIVER FOR AUDIO PLAYER

CROSS-REFERENCES TO RELATED APPLICATIONS

The present application is based upon and claims priority from U.S. Provisional Patent Application No. 61/047,043 filed Apr. 22, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Streaming music is more expensive to send and receive than broadcast music. However, for a variety of reasons few portable devices such as music players and mobile phones are equipped with broadcast radio receivers. Therefore, what is needed is an improved method of providing broadcast radio to a device lacking a broadcast radio receiver.

SUMMARY OF THE INVENTION

An embodiment of the present invention is directed toward an accessory for use with an existing portable electronic device. The accessory includes a unitary housing that removably couples to a housing of the existing portable electronic device such that the accessory and portable electronic device can function and be portably carried as a single unit. A tunable FM radio receiver in the unitary housing receives an FM broadcast signal and produces a broadcast audio output. A connector on the unitary housing electrically connects the broadcast audio output of the tunable FM radio receiver to a corresponding connector on the portable electronic device when the unitary housing is coupled to the housing of the portable electronic device. Application software residing on the portable electronic device utilizes an internet connection of the device to download digital content related to the broadcast audio output of the unitary housing and displays the digital content on a display of the portable electronic device. A data input on the unitary housing receives data from the portable electronic device such that the tunable FM receiver can be tuned to a selected broadcast frequency using controls on the portable electronic device. The application software determines a location of the portable electronic device and downloads a list of available stations from a web server through the internet connection for display on a display of the portable electronic device. Once a station is selected, the application software displays song data and album art downloaded from a web server through the internet connection that corresponds to the broadcast audio output on a display of the portable electronic device. The application software also preferably prompts a listener to purchase a song corresponding to the broadcast audio output with a display of the portable electronic device and downloads a purchased song through the internet connection. The memory of the portable electronic device is preferably used to save the broadcast audio output such that audio corresponding to the broadcast audio output can be paused.

An embodiment of the present invention is also directed toward a method of providing FM broadcasts to an existing portable electronic device. The method commences with removably coupling an accessory in a unitary housing to a device housing of the existing portable electronic device such that the accessory and the portable electronic device function and can be carried as a single unit. An FM broadcast signal is received with a tunable FM radio receiver in the accessory and an audio output signal is produced. Application software is downloaded that configures the portable electronic device to communicate with the accessory from a web server through an internet connection. The audio output signal is transferred to the portable electronic device. An internet connection of the portable electronic device is used to download digital content corresponding to the audio data such as song data and album art from a web server. A location of the portable electronic device is determined and a list of available stations is also downloaded from the web server through the internet connection. The available stations and digital content is displayed on a display of the portable electronic device. The listener is prompted to purchase an audio track corresponding to the audio data with a display of the device and a purchased audio track is downloaded through the internet connection by the application software.

DETAILED DESCRIPTION OF THE INVENTION

The present invention is directed toward a broadcast radio receiving accessory system, that includes hardware and software, which allows owners of existing portable electronic devices having audio outputs, such as iPhones™ and iPods™, to listen to, and interact with, FM radio broadcasts on their devices. The invention uses the resources of an existing FM broadcaster that has an FM transmitter, a computer server connected to the Internet, and a software application capable of coordinating the transmission of audio programming over the FM transmitter with the transmission of corresponding PAD (Program Associated Data) and metadata over the Internet by the server. The invention also uses a receiving component that contains an FM tuner that attaches to an input/output connector of the electronic device such as the 30-pin connector at the bottom of the iPhone™ or iPod™.

The FM tuner is controlled by application software that runs on the electronic device. The application software can be downloaded to the device from the internet, a memory storage device or a personal computer. The application software preferably automatically identifies the listener's geographic location and populates a menu with available local broadcast radio stations. The application software in the digital device obtains location information, such GPS, cell phone triangulation and Wi-Fi triangulation information, from the device and provides the location information to the web based service. The web based service then provides a list of local stations to the device over the Internet.

In addition to allowing listeners to tune the radio to a desired frequency using the controls of the existing device, and listen to broadcast FM radio through their device's headphones, the application software displays PAD and other metadata received from the Internet via a wireless Internet connection, such as Wi-Fi or EDGE, available to the existing portable device. Programming data comes in from the broadcasters' FM transmitter, while PAD comes in from the broadcaster's Internet data service. The application software on the existing device multiplexes the two separate data streams into a rich radio experience for the user of the device. Furthermore, the two data streams, programming and PAD, do not need to be transmitted or received synchronously. For example PAD can be transmitted over the Internet ahead of the transmission of FM programming data. PAD and programming data can be synchronized by the receiving device for playback. In addition, the digital downloading of content provides opportunities for interaction with listeners and the collection of consumer data.

The invention displays on the device's display, for the song received from the accessory's FM receiver, the song title, album if available, and the artist's name as retrieved from the web. The application software also preferably displays various data such as the last three songs played (broadcast) on any station, album art for the currently playing song, the name and picture of the current DJ, other DJ information or links, the station name and logo, and other data about the station. The application software also allows songs to be bookmarked for later purchase and can use the links developed for HD Radio iTunes Tagging.

The invention also produces and collects identifying and anonymous user data for sale to advertisers and radio stations (e.g., geographic location of listeners, duration and time of day stations were listened to). When tuned to a radio station, listeners are able to respond to direct marketing and station promotion messages (e.g., touching a virtual button on the iPhone™ screen to signal approval of a new song, to bookmark a song for later purchase from an online music store or elsewhere, or to signal interest in receiving further information associated with an advertisement) preferably via email.

When tuned to a radio station received through the accessory, listeners can be signed in to the application's web service with a unique user account that contains demographic or psychographic data, as well as those listeners' "click trails" (e.g., music liked, music purchased, daily listening times, location while listening, responses to ads) all of which can potentially be shared with advertisers and radio stations if desired. The application software allows listeners to share what radio station they are listening to, and data about the songs they like, via means such as Facebook™ and MySpace™ widgets.

The present invention is preferably accomplished through an accessory for a portable electronic device that receives broadcast radio stations and application software in the portable electronic device that communicates digitally with the accessory. However, in an alternative embodiment, the software in the device may be used to convert digital commands and data from the device into audio tones that are sent to an audio output of the device and detected by the accessory and decoded into digital data by the application software. This allows the accessory to communicate with a preexisting device that does not have a digital input or output. The application software preferably establishes communication with a web based service that provides data related to the broadcast through a web interface on the device. However, the accessory itself can be provided with a wireless internet connection, although this increases the cost of the accessory.

Figure 1:
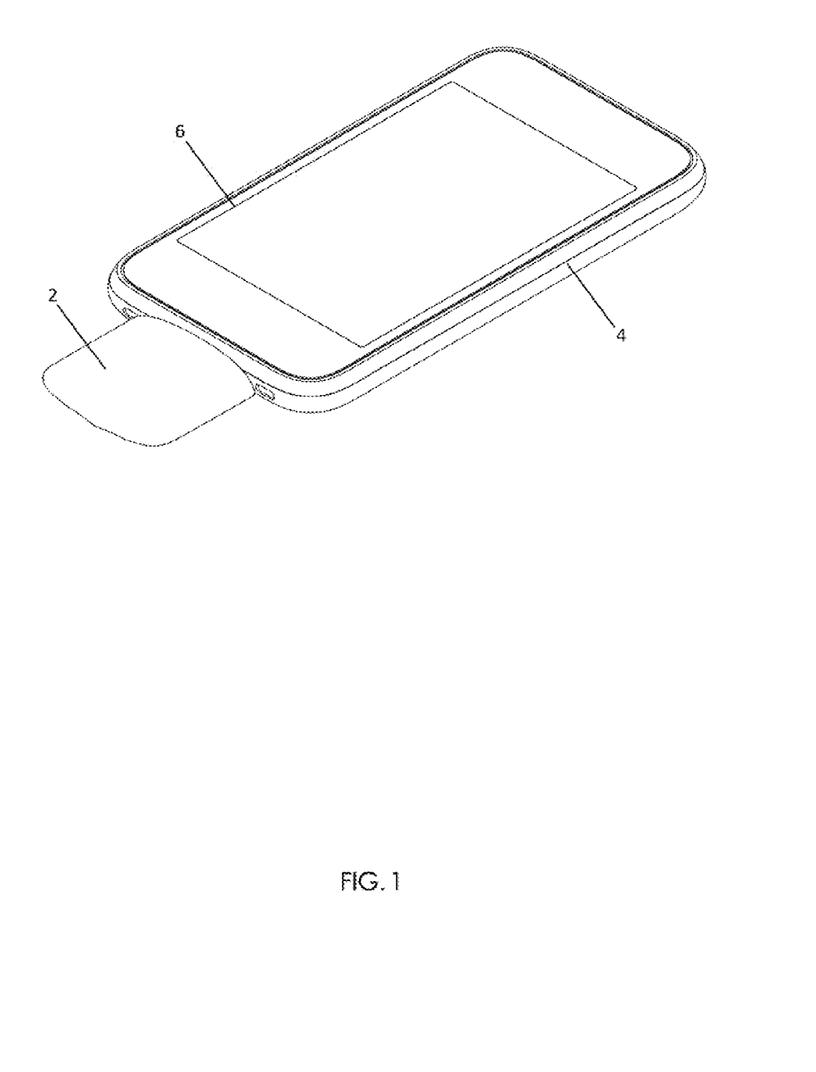
FIG. 1 is an illustration of a radio receiving accessory coupled to a portable electronic device having application software stored in its memory in accordance with an embodiment of the present invention.
Figure 2:
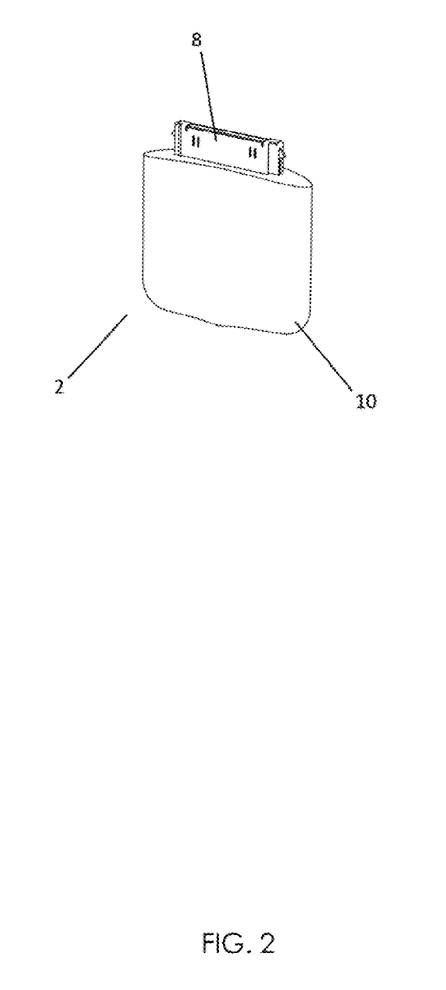
FIG. 2 is an illustration of the radio receiving accessory of FIG. 1 decoupled from the portable electronic device.

Referring now to the figures, FIG. 1 is an illustration of a radio receiving accessory 2 constructed in accordance with present invention coupled to a portable electronic device 4 such as a mobile phone or digital music player having a touch screen display 6. The receiving accessory 2 contains a tunable FM receiver and the device 4 contains the application software needed to manage the receiver and retrieve data from the Internet. FIG. 2 is an illustration of the receiving accessory 2 of FIG. 1 disconnected from the portable electronic device 4. The accessory 2 has a connector 8 that couples to a corresponding connector on the portable electronic device 6 and extends from the unitary housing 10 of the receiving accessory 2.

Figure 3:
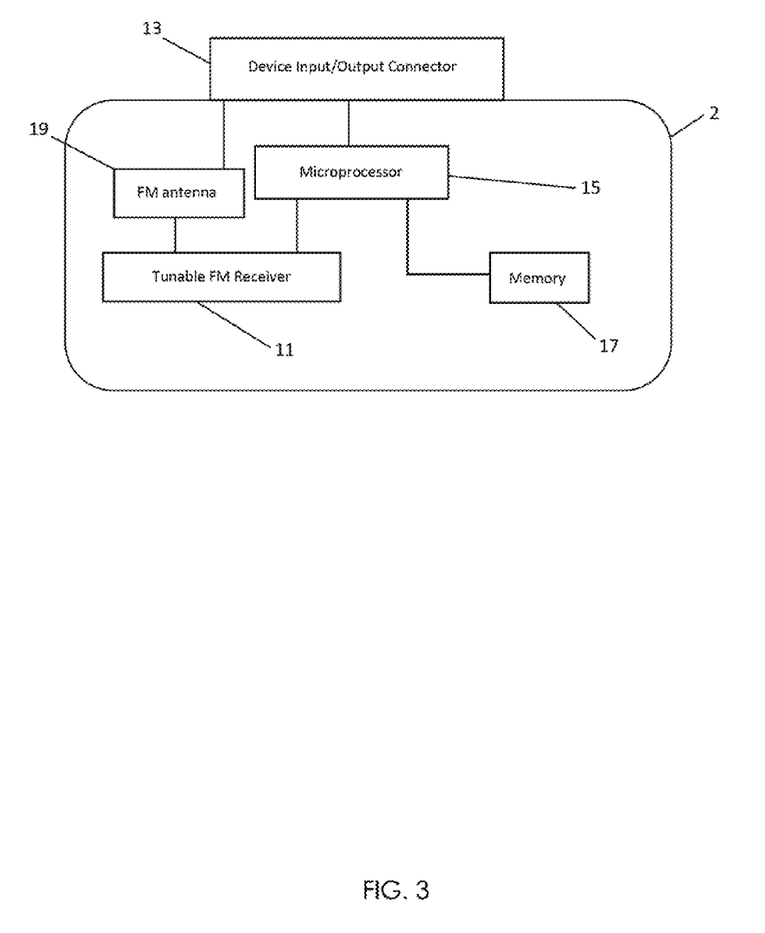
FIG. 3 is a functional block diagram of a receiving accessory constructed in accordance with an embodiment of the present invention.

FIG. 3 is a functional block diagram of the receiving accessory 2 of FIGS. 1 and 2. The preferred receiving accessory 2 includes a tunable FM radio receiver 11 that receives an FM radio broadcast. The tunable FM receiver preferably has the ability to receive and interpret Radio Data System (RDS) data broadcasts when RDS is available. The receiver 11 uses an FM antenna 19 that may be coupled to the device to use a conductive portion of the device to boost the performance of the antenna 19. No controls and no display on the receiving accessory 2 are required. The radio receiver 11 in the accessory 2 can be tuned through the device's controls and the selected frequency displayed on the display of the device. However, the accessory 2 can be provided with controls if desired. Since the receiving accessory 2 preferably uses many of the controls and features of the existing device, the receiving accessory 2 can be simply and inexpensively constructed. A device input/output connector 13 couples the accessory 2 to the electronic device for which it is designed. A microprocessor 15 and memory 17 are used control the tunable receiver 11 and run and store the software required by the receiving accessory 2 to communicate with the device. The application software can pause live radio through the use of a circular buffer in the accessory memory 17 or the device's memory.

The accessory system has the ability to submit requests to stations to play a specific song through the web or cellular interface of the device. The system preferably uses an SMS alert system to alert a user when a requested artist/song is about to play and can be programmed to automatically tune to the selected station. Preferably, the user will request a song, receive an email or text message stating when the song will be played, and click on a link to automatically open the application software and tune the receiver to the appropriate station. The device can display a list of songs playing in a users broadcast market. The user can program the device to play certain songs whenever they are played on an available station or change stations whenever a black listed song is about to play. Intelligent software can be used to examine a user's music library and anticipate songs that they will like and automatically tune to a station playing a song that the user may like.

If the device does not have a digital data input/output that allows digital control signals to be sent to and from the receiving accessory, the application software can create audio outputs corresponding to control functions that are sent to the receiving accessory through the audio output of the device. The receiving accessory receives the tones and decodes them according to a predetermined decoding scheme. A simple two output tone scheme can be created to effectively transmit binary digital data to the receiving accessory through the audio output of the portable device. The same process can be used to transmit data to the device through an audio input of the device.

The present invention need not be embodied in an accessory and can be implemented in any device that has the capability to receive broadcast radio signals and can connect to the internet.

Figure 4:
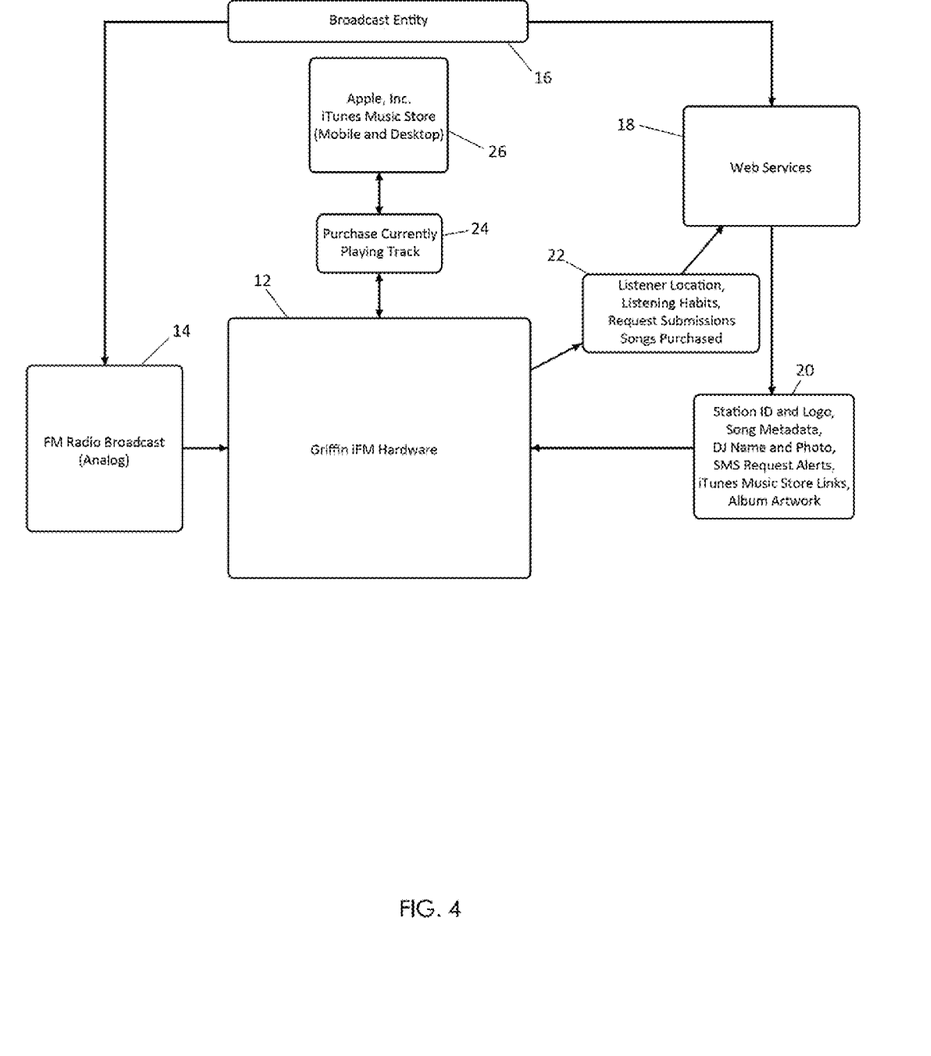
FIG. 4 is a functional block diagram of an accessory system constructed in accordance with an embodiment of the present invention.

FIG. 4 is a functional block diagram of a radio accessory system for implementing an embodiment of the present invention. The radio accessory system hardware and software 12, which includes the receiving accessory 2, device 4 and corresponding application software discussed herein, receives an analog FM radio broadcast 14 from a broadcast entity 16 through an FM receiver in the system 12. The broadcast entity 16 also provides data to a web based server 18 that provides web services that can be accessed through an internet connection. The system 12 includes an internet connection in either the receiving accessory 2 or device 4 which it uses to download web content 20 such as the radio station ID and logo, song metadata, DJ name and photo, SMS requests and alerts, music store links album artwork, etc from the web based server 18. The system 12 has the ability to automatically switch from FM radio to IP Radio when Wi-Fi is present, for better reception. Preferred Wi-Fi transceivers for connection to by the system 12 can be identified by the user.

The system 12 also uses its internet connection to push user data and requests 22 to the web based server 18. The system 12 can, preferably with the user's consent, return data to radio station broadcasters 16 showing the number of listeners in near real-time, including their rough geographic locations. Listeners are able to respond to direct marketing and station promotion messages (e.g., touching a virtual button on the device screen to signal approval of a new song, to bookmark a song for later purchase, or to signal interest in receiving further information associated with an advertisement, via email). The application software can display the current artist's upcoming concert dates, and their proximity to the user's location. Ticket purchases can be made through the use of the application software and web interface.

Listeners can be signed into the web server 18 with a unique user account that contains demographic or psychographic data, as well as those listeners' "click trails" (e.g., music liked, music purchased, daily listening times, location while listening, responses to ads) all of which can be shared with the radio stations or advertisers with the users consent. This information is collected by the application software in the system 12. If the device is a mobile phone, the application software can provide the users phone number to the web service 18.

The system 12 includes application software which allows listeners to share what station they are listening to, and data about the songs they like, via various means such as Facebook™ and MySpace™ widgets. The application software in the system 12 also has the ability to "tag" a currently playing track for later purchase from an on-line music store and keeps a record of previously played tracks on a given station. The system 12 sends the listener data to the web server 18 where it can be published or shared on websites through widgets or objects.

The system 12 preferably allows listeners to type in an artist or song name that will be sent as a request to a broadcast entity 16. A responding SMS text message is then sent to the listener's device that confirms that the requested music is in the queue. Preferably, the system is designed so that the responding SMS text message contains a link that, when selected (touched), instructs the device to launch the application and automatically tune it to the correct station to hear the requested music. The system 12 application software also allows a user to request a SMS text message when a particular song is scheduled to be played on an available station. Once a request is received, the web server 18 generates an SMS text message with a link that, when selected, launches the system 12 application software and tunes the radio receiver to the correct station frequency. The system 12 also has a purchase current track function 24 that allows a user to directly purchase music from a web based music store 26.

Figure 5:
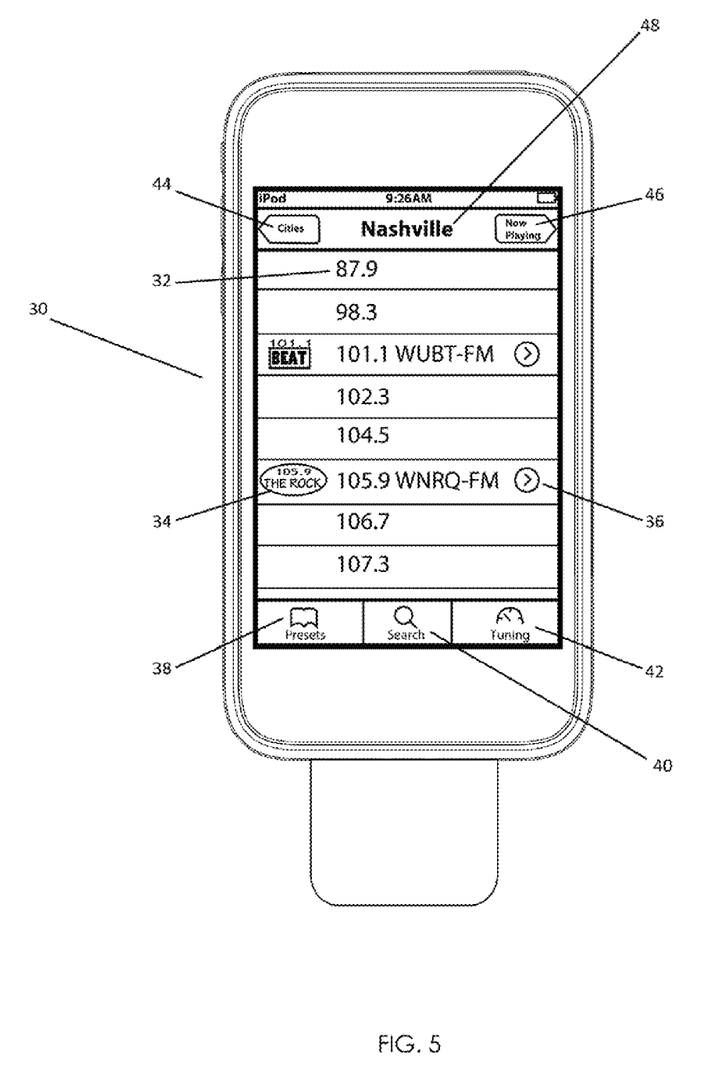
FIG. 5 is an illustration of a tuning interface display produced by application software in accordance with an embodiment of the present invention.

FIG. 5 is an illustration of a tuning display screen 30 generated on the touch display of the device to which the receiving accessory is coupled. While the illustrated display is preferred, any suitable display format may be used. The tuning display screen 30 displays information needed to use the accessory. The preferred tuning display screen 30 shown displays a list of available radio station identifiers 32 in a particular area such as a city 48. The user can select a station by touching the station identifier 32 on the touch screen. An area selector input 44 allows the user to enter a menu and alter the region for which the station identifiers 32 are displayed. The station identifiers 32 may include a graphic logo 34 provided by the station. Preferred stations for which additional meta data is available preferably show up highlighted in the tuning menu. A more station data selection input 36 allows a user to view any additional station data available such as genre or programming schedule. A set of menu selections allow the user to select present stations 38, search for particular stations 40, or tune to a particular frequency 42. The radio presets may be user-defined radio presets or favorites that can be selected from a list. A now playing input 46 allows the user to view additional information concerning the currently playing track in a now playing interface 50 as shown in more detail in FIG. 6.

The receiving accessory and application software for the audio output device may be used to provide the device with a number of additional advanced features such as location based tuning. In such an embodiment, the application automatically identifies the listener's geographic location through any number of available means such as the Global Positioning System and populates a tuning menu with local radio stations (alternatively, listeners can manually enter their location information). Available local radio stations show up highlighted in the tuning menu. The application software or service provider can categorize the stations into genres or formats. The application software can also collect data such as time listened to, songs heard, time of turn off, driving status, promotions, smash or trash. The application software book also bookmarks songs for later purchase online.

Figure 6:
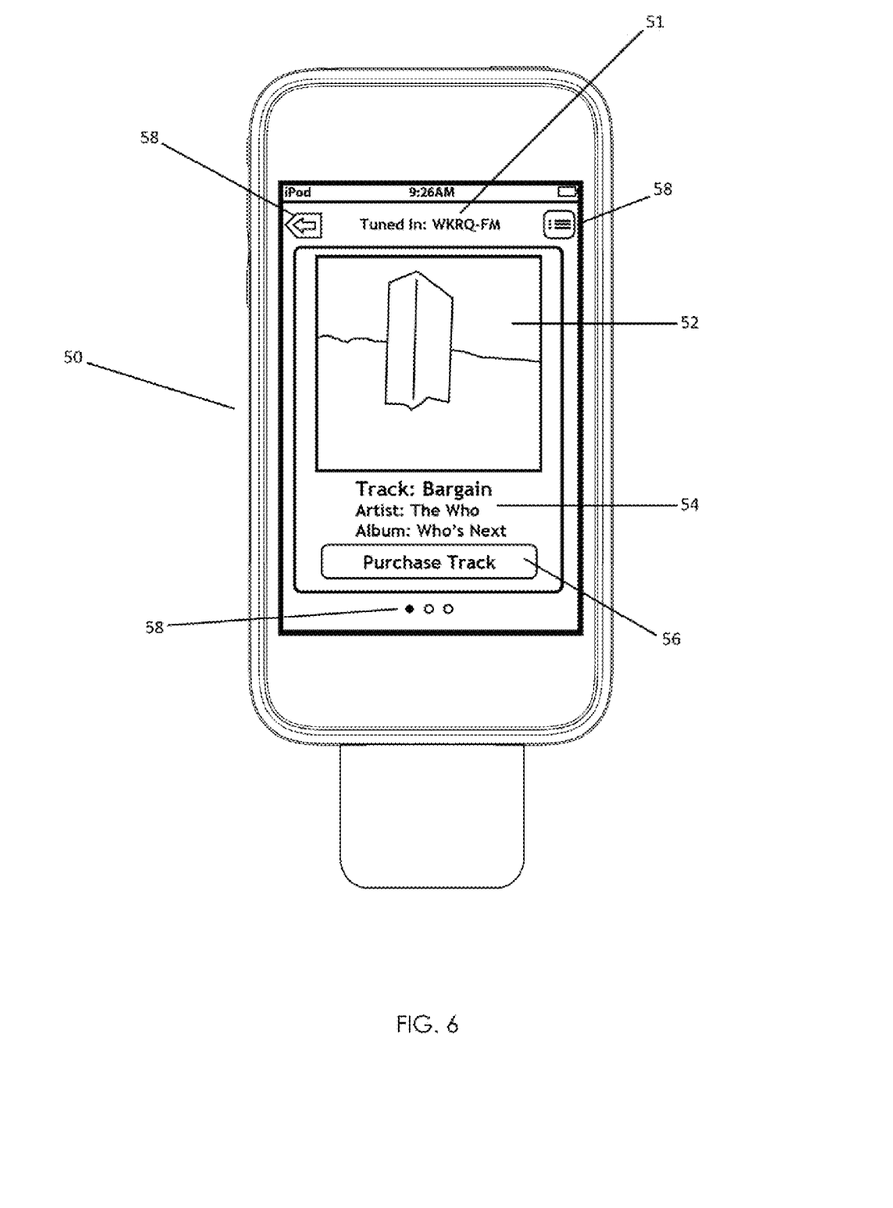
FIG. 6 is an illustration of a now playing interface display produced by application software in accordance with an embodiment of the present invention.

The now playing display screen 50 shown in FIG. 6 displays information such as the station tuned in 51, album art 52 and song data 54. The now playing display 50 also has a purchase track input 56 that allows the user to automatically purchase a digital copy of the currently playing track from an online music store. A number of navigation inputs 58 are provided that allow the user to switch between the various displays screens.

Figure 7:
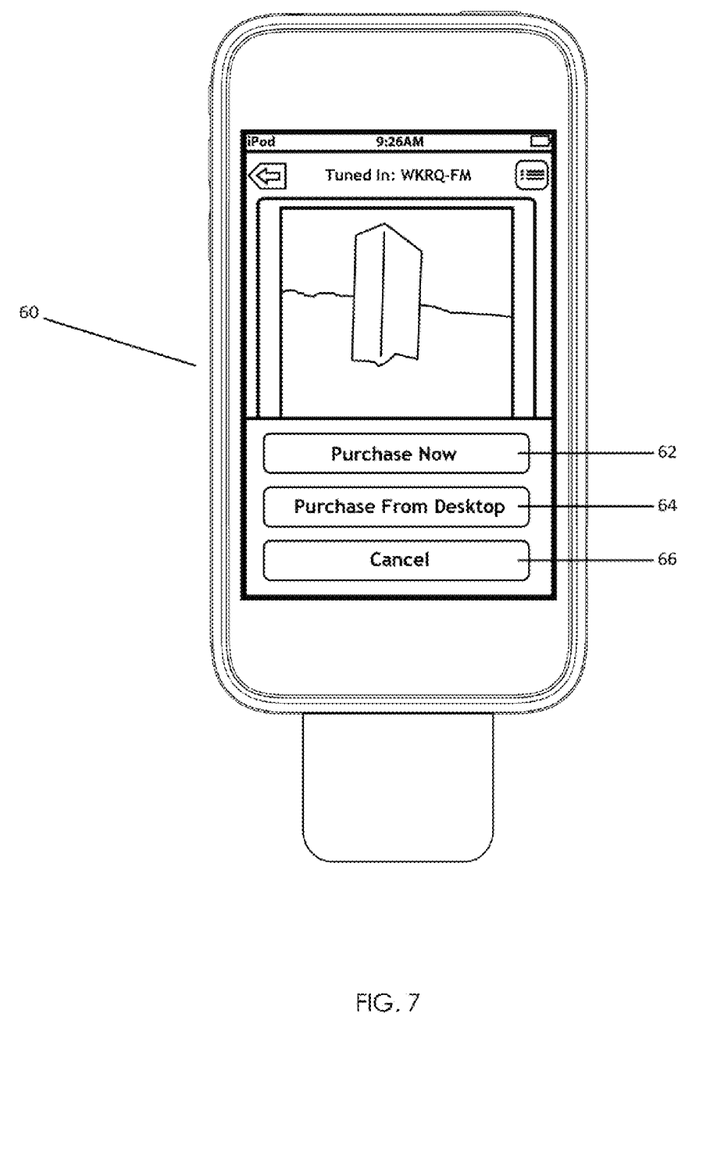
FIG. 7 is an illustration of a purchase track interface display produced by application software in accordance with an embodiment of the present invention.

When the purchase track input 56 is activated, a purchase screen display 60 opens on the display of the device as shown in FIG. 7. The purchase screen display 60 allows the user to purchase the track either directly 62 or through the desktop 64 software of the device. In the preferred embodiment, listeners can bookmark songs for later purchase from an online music retailer such as iTMS™ (iTunes Music Store). Alternatively, listeners are able to purchase a song immediately by activating the purchase directly selection 62 that launches the online music retailer's website on the phone (if connected via Wi-Fi) or, tag a song for later purchase from the online music store on the desktop via a tagging technology. A cancel input 66 allows the user to cancel their purchase request and return the prior display.

Although there have been described particular embodiments of the present invention of a new and useful RECEIVER FOR AUDIO PLAYER, it is not intended that such references be construed as limitations upon the scope of this invention except as set forth in the following claims.

We claim:

1. An accessory for use with an existing portable electronic device that does not have an FM radio receiver, said accessory comprising:
    a unitary housing that removably couples to a housing of the portable electronic device such that the accessory and portable electronic device function and can be portably carried as a single unit;
    a tunable FM radio receiver in said unitary housing that receives an FM broadcast signal and produces a broadcast audio output;
    a connector on said unitary housing that electrically connects said broadcast audio output of said tunable FM radio receiver to a corresponding connector on said portable electronic device when said unitary housing is coupled to said housing of said portable electronic device;
    application software residing on said portable electronic device that utilizes an internet connection of said portable electronic device to contact a web interface that identifies said broadcast audio output of said accessory housing and automatically downloads digital content related to said broadcast audio output produced by said tunable FM radio receiver in said unitary housing and display said digital content on a display of said portable electronic device while said portable electronic device simultaneously produces an audio output based upon said broadcast audio output;
    a data input on said unitary housing that receives data from said portable electronic device such that said tunable FM receiver can be tuned to a selected broadcast frequency using controls on said portable electronic device; and
    wherein said application software further allows a user to select a desired song and said web interface generates and sends a text message to said portable electronic device indicating when said desired song will be played on an FM station available to said tunable FM radio receiver in said unitary housing coupled to said portable electronic device; and
    wherein said application software prompts a listener to purchase a song corresponding to said broadcast audio output of said tunable FM radio receiver with a display of said portable electronic device and downloads a purchased song through said internet connection; and
    wherein said application software determines a location of said portable electronic device and downloads a list of available stations from a web server through said internet connection for display on a display of said Portable electronic device; and
    wherein said application software uses a memory of said portable electronic device to save said broadcast audio output of said tunable FM radio receiver such that audio corresponding to said broadcast audio output can be paused.

2. The accessory of claim 1 wherein said application software displays song data and album art downloaded from a web server through said internet connection that corresponds to said broadcast audio output of said tunable FM radio receiver on a display of said portable electronic device.

3. An accessory for use with an existing portable electronic device that does not have a radio receiver, said accessory comprising:
    an accessory housing that removably couples to a device housing of the existing portable electronic device such that the accessory and portable electronic device function and can be portably carried as a single unit;
    a tunable radio receiver in said accessory housing that receives a broadcast signal and produces an audio output;
    a connector on said accessory housing that electrically connects said audio output of said tunable radio receiver to a corresponding connector on said portable electronic device when said accessory housing is coupled to said device housing of said portable electronic device; and
    application software residing on said portable electronic device that identifies said audio output of said accessory housing and utilizes an internet connection of said portable electronic device to automatically download digital content related to said audio output of said accessory housing and displays said digital content on a display of said portable electronic device while said portable electronic device produces an audio output based upon said audio output;
    wherein said application software further allows a user to select a desired song and said accessory generates and sends a message to said portable electronic device indicating when said desired song will be available on said tunable radio receiver in said accessory housing coupled to said device housing; and
    wherein said application software determines a location of said Portable electronic device and downloads a list of available stations from a web server through said internet connection for display on is display of said portable electronic device; and
    wherein said application software prompts a listener to purchase a song corresponding to said audio output with a display of said portable electronic device and downloads a purchased song through said internet connection; and
    wherein said application software uses a memory of said portable electronic device to save said audio output such that audio corresponding to said audio output can be paused; and
    wherein said connector further comprises a data input that receives data from said portable electronic device such that said tunable radio receiver can be tuned using controls on said portable electronic device.

4. The accessory of claim 3 wherein said application software displays song data and album art downloaded from a web server through said internet connection that corresponds to said audio output on a display of said portable electronic device.

5. The accessory of claim 3 wherein said tunable radio receiver in said device housing communicates with said portable electronic device through the use of encoded audio tones transferred through audio inputs and outputs.

6. A method of providing FM broadcast radio to an existing portable electronic device that does not have an FM radio receiver, said method comprising the steps of:

removably coupling an accessory in a unitary housing to a housing of the existing portable electronic device such that the accessory and the portable electronic device function and can be carried as a single unit;

receiving an FM broadcast signal with a tunable FM radio receiver in said accessory and producing an audio output signal;

transferring said audio output signal from said accessory to said portable electronic device;

using an internet connection of said portable electronic device to identify said audio output signal received from said accessory and automatically download digital content related to said audio output signal of said accessory;

displaying said digital content on a display of said portable electronic device while contemporaneously producing an audio output based upon said audio output signal with said portable electronic device;

allowing a user to select a desired song and generating and sending a message to said portable electronic device indicating when said desired song will be available on said tunable FM radio receiver in said accessory coupled to said portable electronic device;

downloading application software that configures said portable electronic device to communicate with said accessory from a web server through said internet connection;

prompting a listener to purchase an audio track corresponding to the audio output signal with a display of said portable electronic device and downloading a purchased audio track through said internet connection;

determining a location of said portable electronic device and downloading a list of available stations from a web server through said internet connection; and     using a memory of said portable electronic device to save said audio output signal such that audio corresponding to said audio output signal can be paused.

7. The method of claim 6 further comprising displaying song data and album art downloaded from a web server through said internet connection corresponding to said audio output signal on a display of said portable electronic device.

8. The method of claim 6 further comprising the step of using audio tones to transmit encoded data between said accessory and said portable electronic device.

* * * * *